United States Patent [19]

Miyadera

[11] Patent Number: 5,313,225
[45] Date of Patent: May 17, 1994

[54] LIQUID CRYSTAL DISPLAY DEVICE

[75] Inventor: Shunichi Miyadera, Tokyo, Japan

[73] Assignee: Asahi Kogaku Kogyo Kabushiki Kaisha, Tokyo, Japan

[21] Appl. No.: 900,757

[22] Filed: Jun. 19, 1992

Related U.S. Application Data

[63] Continuation of Ser. No. 531,242, May 31, 1990, abandoned.

[30] Foreign Application Priority Data

Jun. 6, 1989 [JP] Japan .................. 1-143496

[51] Int. Cl.⁵ .................................. C09G 3/36
[52] U.S. Cl. ........................ 345/102; 385/211
[58] Field of Search .............. 340/784, 765; 359/48; 364/707; 345/102, 87, 50; 358/165

[56] References Cited

U.S. PATENT DOCUMENTS

| | | | |
|---|---|---|---|
| 4,250,413 | 2/1981 | Kawasaki et al. | 307/293 |
| 4,417,135 | 11/1983 | Motoyama et al. | 364/707 |
| 4,436,397 | 3/1984 | Kobayashi | 354/465 |
| 4,498,751 | 2/1985 | Goto | 350/345 |
| 4,767,193 | 8/1988 | Ota et al. | 350/345 |
| 4,811,200 | 3/1989 | Wagner et al. | 364/200 |
| 4,825,143 | 4/1989 | Cheng | 340/707 |
| 4,868,563 | 9/1989 | Stair et al. | 340/765 |
| 5,065,357 | 11/1991 | Shiraishi et al. | 364/707 |
| 5,078,476 | 1/1992 | Shin | 359/48 |

FOREIGN PATENT DOCUMENTS

| | | |
|---|---|---|
| 2619367 | 11/1977 | Fed. Rep. of Germany . |
| 3147619 | 6/1983 | Fed. Rep. of Germany . |
| 55-117382 | 9/1980 | Japan . |
| 56-152383 | 11/1981 | Japan . |
| 58-129880 | 8/1983 | Japan . |
| 60-177777 | 9/1985 | Japan . |
| 1-14181 | 1/1989 | Japan . |
| 1-74876 | 3/1989 | Japan . |
| 0105112 | 4/1990 | Japan .................. 359/48 |

OTHER PUBLICATIONS

English abstracts and Summaries of Japanese Patent Document Nos. 1-74,876, 60-177,777, 1-4,181, 58-129,880, 56-152,383 and 55-117,382.
French Search Report and Annex.

*Primary Examiner*—Ulysses Weldon
*Assistant Examiner*—Doon Chow
*Attorney, Agent, or Firm*—Sandler, Greenblum & Bernstein

[57] ABSTRACT

A liquid crystal display device for receiving a video signal and displaying an image corresponding thereto having a liquid crystal display for displaying an image corresponding to a received video signal on a liquid crystal display, and a back light provided for irradiating light thereto. A switch is used for turning ON and OFF the back light. The back light is automatically turned OFF when a predetermined period of time passes in which the video signal, carrying image data in a predetermined condition, is not received.

15 Claims, 3 Drawing Sheets

LIQUID CRYSTAL DISPLAY DEVICE

This application is a continuation, of application Ser. No. 07/531,242, filed May 31, 1990, now abandoned.

BACKGROUND OF THE INVENTION

The present invention relates to a liquid crystal display device that is applicable to a monitor of an electronic still camera or the like.

Recently, electronic still cameras have become popular. In the electronic still camera, an object is photographed by photographing elements and recorded on a recording medium, such as a magnetic disk. An output from the photographing elements or regenerated signal from the recording medium is displayed on a liquid crystal display of the electronic still camera. A user can monitor the object image through the liquid crystal display.

In conventional electronic still cameras, when a monitoring through a liquid crystal display is instructed, the liquid crystal display is thereafter held in a driven state, regardless of whether it is monitored or not, unless the instruction is released. Since a liquid crystal display does not emit light by itself, light is usually irradiated from a lamp, such as a fluorescent tube. As a result, there is a drawback in that the lamp is turned ON even if the object image on the liquid crystal display is not being monitored. Thus, the life of the fluorescent tube is shortened and a battery is consumed more than necessary.

SUMMARY OF THE INVENTION

It is therefore an object of the present invention to provide a liquid crystal display device that is capable of preventing electric power from being consumed more than necessary and the life of a light irradiating unit, such as a fluorescent tube or the like, from being shortened.

For the above object, according to the invention, there is provided a liquid crystal display device for receiving a video signal and displaying an image corresponding to the video signal, comprising a liquid crystal display member for displaying a visual image corresponding to the received video signal, means for irradiating light to the liquid crystal display member, and switch means for turning ON and OFF the irradiating means, the liquid crystal display device further comprises:

means for examining the received video signal;
timer means for measuring a period of time, the timer means starting to measure the period of time based upon the result of the examination means; and
control means for turning OFF the irradiating means if it has passed a predetermined period of time since the timer means started measuring the period of time, even if the irradiating means has been turned ON with the switch means.

DESCRIPTION OF THE ACCOMPANYING DRAWINGS

DESCRIPTION OF THE EMBODIMENT

Figure 1:
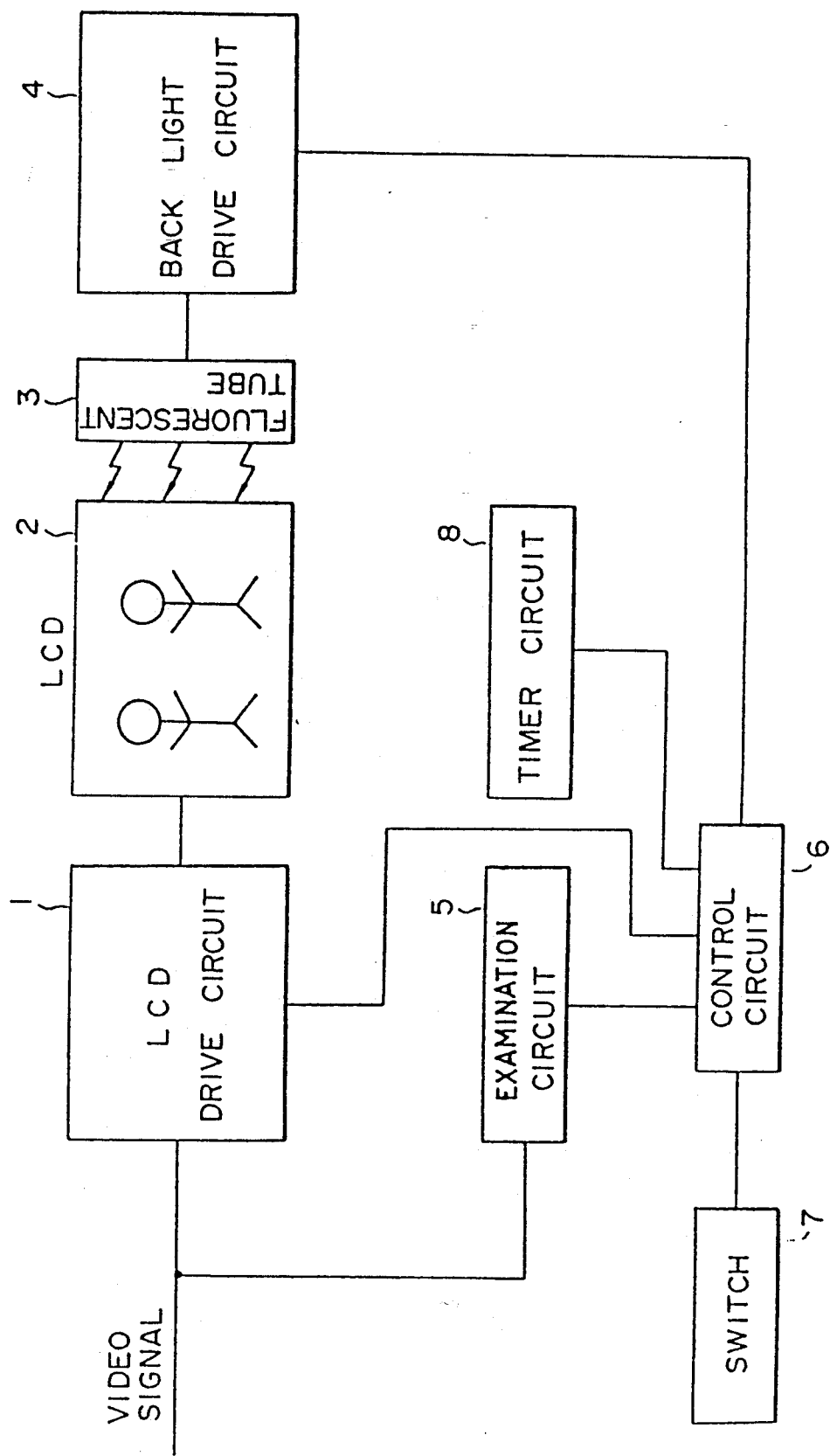
FIG. 1 is a block diagram showing the arrangement of an embodiment of a liquid crystal display device according to the present invention.

FIG. 1 is a block diagram showing the arrangement of an embodiment of a liquid crystal display device according to the present invention.

In FIG. 1, a drive circuit 1 electrically drives a liquid crystal display (LCD) 2. A fluorescent tube 3, such as a light irradiating unit electrically driven by a back light drive circuit 4.

An examination circuit 5 examines a video signal that is supplied to the liquid crystal display 2. A control circuit 6, composed of, for example, a microcomputer or the like, controls the operation of various circuits, means and the like. A switch 7 is operated when an image is displayed at the liquid crystal display 2. Switch 7 is a main switch for turning ON and OFF a power supply to the device as a whole, or alternately, a switch can be provided independent of it for selecting whether an image is to be displayed on the liquid crystal display 2 or not, such as, for example, a switch used when a monitor mode is set.

A timer circuit 8 is provided for effecting a time measuring operation, which can sometimes be substantially contained in the control circuit 6.

Figure 2:
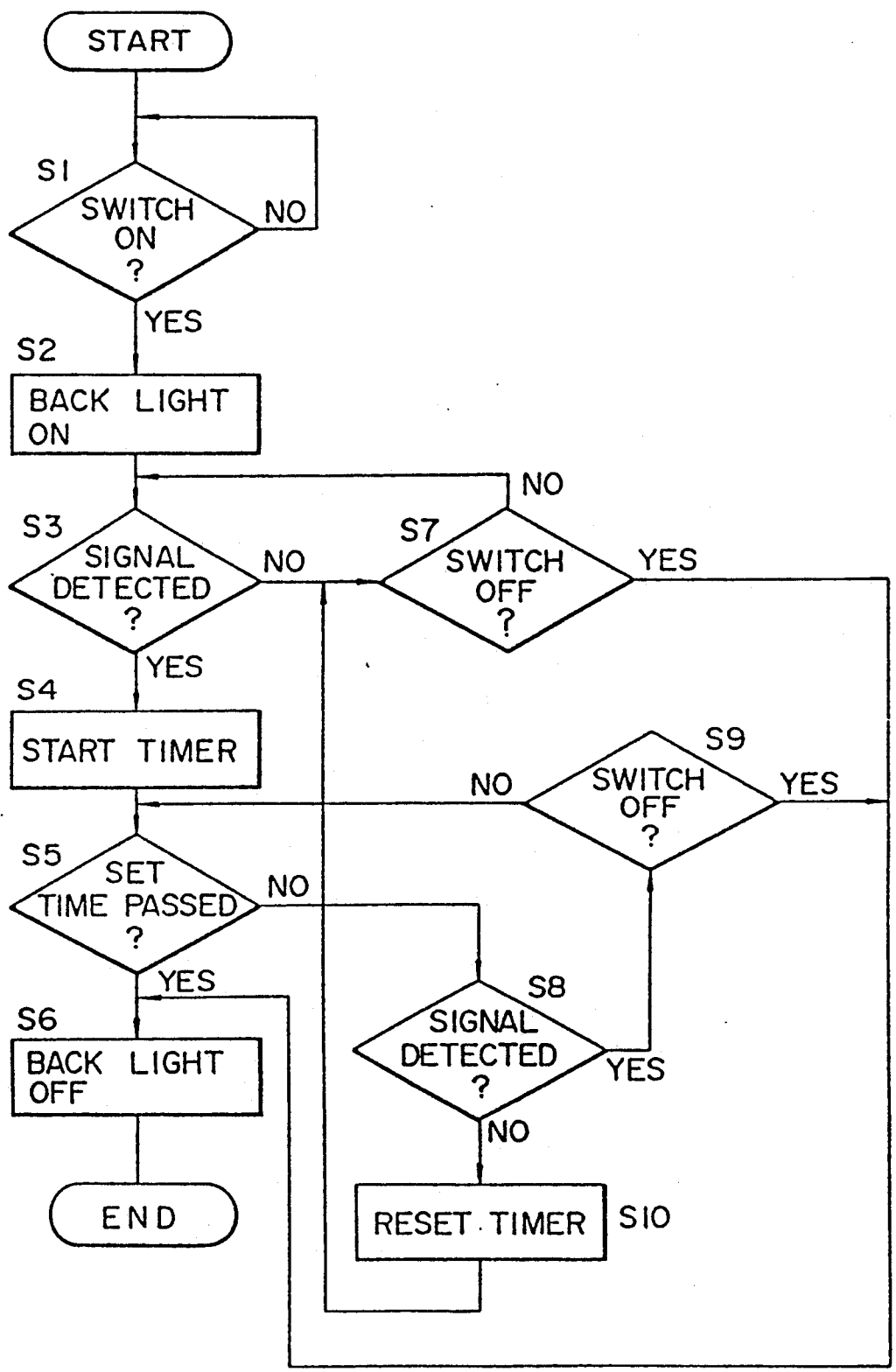
FIG. 2 is a flowchart explaining a processing operation used in the embodiment in FIG. 1.

Next, the operation of the device will be described with reference to a flowchart shown in FIG. 2.

First, it is examined whether switch 7 is turned ON and OFF in step 1. When it is turned ON, control circuit 6 applies a control signal to the drive circuit 4 to turn ON the fluorescent tube 3 as a back light (step S2). Light emitted from the fluorescent tube 3 to act is irradiated to the liquid crystal display 2 from a back side thereof.

On the other hand, the LCD drive circuit 1 drives the liquid crystal display 2 corresponding to an input video signal from a light receiving element (not shown) or a regenerated signal from a recording medium (not shown). Therefore, an image corresponding to the video signal is displayed on the liquid crystal display 2 so that a user can monitor it.

The video signal applied to the LCD drive circuit 1 is also applied to the examination circuit 5. The examination circuit 5 examines, for example, an average level of a luminance signal of the video signal. Then, the average level of the luminance signal is compared with a predetermined preset reference level, and when the average level is lower than the reference level, the examination circuit 5 outputs an examination signal. Alternatively, the examination circuit 5 examines whether a synchronous signal (horizontal synchronous signal or vertical synchronous signal) is contained in the video signal or not, and when the synchronous signal is contained in the video signal, the examination circuit 5 outputs an examination signal (in step S3).

The control circuit 6 monitors the examination signal inputted from the examination circuit 5. When an average level of the luminance signal is above the reference value, or the synchronous signal exists, that is, the examination signal is not outputted from the examination circuit 5 in step S3, the control circuit 6 monitors an operating state of which 7 (in step S7).

When switch 7 is turned OFF, the control circuit 6 controls the back light drive circuit 4 and turns OFF the fluorescent tube 3 (in steps S9, S6).

When the examination circuit 5 outputs an examination signal indicating that the average level of the luminance signal is below the reference value or the synchronous signal disappears in the state that switch 7 is turned ON, control circuit 6 causes the timer circuit 6 to start a time measuring operation (in step S4).

While the timer circuit 8 is in the time measuring operation, control circuit 6 monitors signals from the examination circuit 5 and switch 7 (in steps S8, S9). When the average level of the luminance signal is above the reference value or the synchronous signal is examined during the time measuring operation, the control circuit 6 causes the time measuring operation to interrupt and timer 8 is reset (in step S10). In addition, when switch 7 is turned OFF during the time measuring operation, control circuit 6 controls the back light drive circuit 4 to turn OFF the fluorescent tube 3 (in step S6).

When the predetermined preset period of time (e.g., 5 minutes) has passed, timer circuit 8 applies a signal to control circuit 6. At this time, control circuit 6 applies a control signal to the drive circuit 4 to turn OFF the fluorescent tube 3, even if switch 7 is turned ON (in steps S5, S6).

Figure 3:
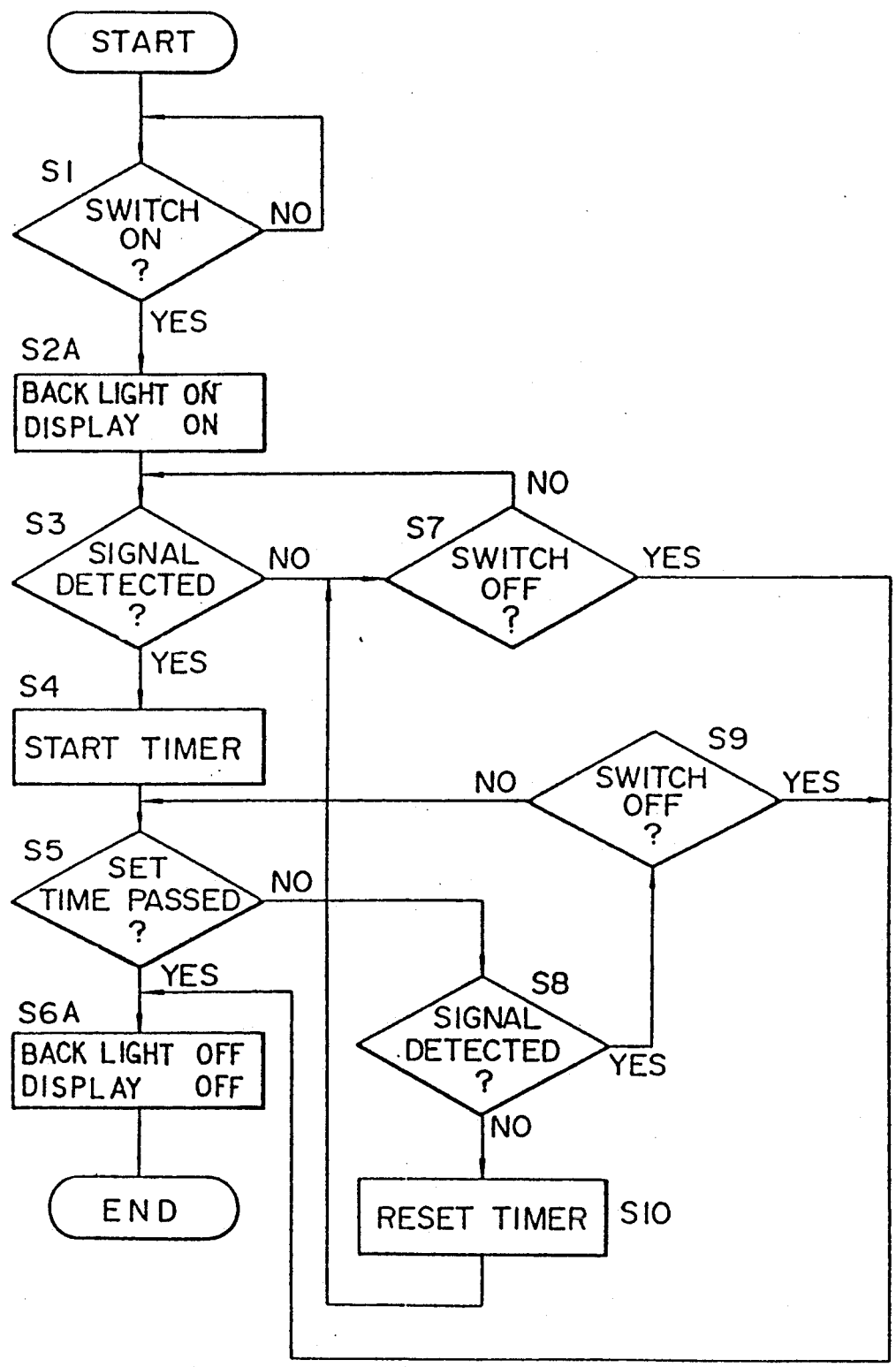
FIG. 3 is a flowchart explaining a modified processing operation used in the embodiment in FIG. 1.

Note that although only the fluorescent tube 3 is turned OFF when the device is not in use in the above embodiment, the liquid crystal display 2, which is driven by the LCD drive circuit 1, may also be simultaneously interrupted (refer to FIG. 3, steps S2A and S6A).

Further, the examination circuit may also examine whether the average level of the luminance signal is between the reference value and a second predetermined reference value, which is higher than the reference value.

As described above, according to the liquid crystal display device of the present invention, since a video signal is examined and the light irradiating unit is turned OFF corresponding to the condition of the video signal, the light irradiating unit can be prevented from being unnecessarily used, extending the life of the unit and reducing the amount of electric power that is consumed. Therefore, it is advantageously applied to electronic devices, such as electronic still cameras, which are often driven by a battery.

What is claimed is:

1. A liquid crystal display device for displaying an image having a liquid crystal display member for displaying an image corresponding to a received video signal having at least a luminance signal, means for irradiating light to said liquid crystal display member, and switch means for turning ON and OFF said irradiating means, said liquid crystal display device comprising:

means for examining said received video signal having at least a luminance signal, said examination means examining said signal based upon an average level of the luminance signal contained in said video signal;

timer means for measuring a period of time, said timer means being reset when said average level of said luminance signal contained in said video signal is not within a predetermined range; and control means for controlling said timer means to start measuring said period of time based upon a result of said examination means and for turning OFF said irradiating means if a predetermined period of time has passed since said timer means started measuring said period of time.

2. The liquid crystal display device according to claim 1, wherein said light irradiating means comprises a fluorescent tube.

3. The liquid display device according to claim 1, wherein said means for turning turns ON and OFF said display members as well as said irradiating means, and wherein said control means turns OFF said liquid crystal display member as well as said irradiating means if the predetermined period of time has passed since said timer means started measuring said period of time, even if both said liquid crystal display member and said irradiating means have been turned ON by said means for turning.

4. The liquid crystal display device according to claim 1, said examining means comprising means for examining said luminance signal of said video signal.

5. A liquid crystal display device for displaying an image in response to a video signal including at least a luminance signal, said liquid crystal display device comprising:

a liquid crystal display member for displaying said image;

light means for irradiating light to said liquid crystal display member;

detecting means for detecting that a predetermined condition of said video signal including a luminance signal is present; and control means for controlling said light means to turn OFF when said detecting means detects a predetermined condition is present for a predetermined period of time;

said detection means comprises examination means for examining said signal and indicating when said predetermined condition is present, said examination means examining said signal to determine an average level of the luminance signal component of said signal and timer means for measuring said predetermined period of time, said timer means is reset when said average level of said luminance signal component of said signal is not within a predetermined range.

6. The liquid crystal display device according to claim 5, wherein said control means controls said timer means to start measuring said predetermined period of time when said examination means indicates that said predetermined condition is present, said control means turning OFF said light means after said predetermined period of time has been measured by said timer means.

7. The liquid crystal display device according to claim 6, further comprising switch means for switching said liquid crystal display member and said light means ON and OFF, said controls means turning OFF said display member and said light means when said detection means detects that said predetermined condition is present for said predetermined amount of time, even if both said display member and said light means have been switched ON by said switch means.

8. The liquid crystal display device according to claim 5, further comprising switch means for switching said light means ON and OFF, said control means turning OFF said light means when said detecting means detects that said predetermined condition is present for said predetermined period of time, even if said light means has been switched ON by said switch means.

9. A liquid crystal display device according to claim 5, wherein said light means comprises a fluorescent tube.

10. The liquid crystal display device according to claim 5, said detecting means comprises means for detecting the predetermined condition of said luminance signal of said video signal.

11. A liquid crystal display device for displaying an image having a liquid crystal display member for displaying an image corresponding to a received video signal having at least a luminance signal, means for irradiating light to said liquid crystal display member and means for turning said irradiating means ON and OFF, said liquid crystal display device comprising;
   means for examining a predetermined condition of said luminance signal of said video signal;
   timer means for measuring a period of time;
   means for resetting said timer means when an average level of said luminance signal of said video signal is not within a predetermined range; and
   control means for controlling said timer means to start measuring said period of time based on a result of an examination, by said examining means, of said luminance signal, and for turning OFF said irradiating means if a predetermined period of time has passed after said timer means started measuring said period of time.

12. The liquid crystal display device according to claim 11, said predetermined condition comprising the average level of said luminance signal of said video signal.

13. The liquid crystal display device according to claim 11, said control means turning said display member and said irradiating means OFF once said examination means detects that said predetermined condition is present for said period of time, even if both said display member and said irradiating means have been turned ON by said turning means.

14. A liquid crystal display device for displaying an image having a liquid crystal display member for displaying an imaging corresponding to a received video signal having at least a luminance signal, means for irradiating light to said liquid crystal display member and means for turning said irradiating means ON and OFF, said liquid crystal display member comprising:
   means for examining a predetermined condition of luminance signal of said video signal, said examining means comprising means for determining whether an average level of said the luminance signal of said video signal is between first and second predetermined reference values;
   timer means for measuring a period of time; and
   control means for controlling said timer means to start measuring said period of time based on a result on an examination, by said examining means of said luminance signal, and for turning OFF said irradiating means if a predetermined period of time has passed after timer means started measuring said period of time.

15. The liquid crystal display device according to claim 14, said control means turning said display member and said irradiating means OFF when said examination means detects that said predetermined condition is present for said period of time, even if both said display member and said irradiating means have been turned ON by said turning means.

* * * * *